(12) United States Patent
Refsum

(10) Patent No.: US 7,370,877 B2
(45) Date of Patent: May 13, 2008

(54) LOCKING DEVICE FOR A TELESCOPIC STEM OF A TROLLEY

(75) Inventor: Bjørn Refsum, Ålesund (NO)

(73) Assignee: Stokke AS, Skodje (NO)

( * ) Notice: Subject to any disclaimer, the term of this patent is extended or adjusted under 35 U.S.C. 154(b) by 73 days.

(21) Appl. No.: 10/563,174

(22) PCT Filed: Jun. 25, 2004

(86) PCT No.: PCT/NO2004/000189

§ 371 (c)(1),
(2), (4) Date: Dec. 30, 2005

(87) PCT Pub. No.: WO2005/002945

PCT Pub. Date: Jan. 13, 2005

(65) Prior Publication Data

US 2006/0157945 A1    Jul. 20, 2006

(30) Foreign Application Priority Data

Jul. 3, 2003   (NO) .................................. 20033052

(51) Int. Cl.
*B62B 1/00*      (2006.01)
(52) U.S. Cl. ................. 280/655; 280/47.315; 16/113.1
(58) Field of Classification Search ................ 280/655, 280/655.1, 47.315, 47.371, 47.36; 16/113.1, 16/114.1, 405; 190/115, 18 A
See application file for complete search history.

(56) References Cited

U.S. PATENT DOCUMENTS

| | | | | | |
|---|---|---|---|---|---|
| 5,459,908 | A | * | 10/1995 | Chen | 16/113.1 |
| 5,500,981 | A | * | 3/1996 | Ho | 16/113.1 |
| 5,584,097 | A | * | 12/1996 | Lu | 16/113.1 |
| 5,729,866 | A | * | 3/1998 | Chg | 16/405 |
| 6,009,598 | A | * | 1/2000 | Chang | 16/113.1 |
| 6,081,967 | A | * | 7/2000 | Chang | 16/113.1 |
| 6,122,800 | A | * | 9/2000 | Cheng | 16/113.1 |
| 6,148,477 | A | * | 11/2000 | Cheng | 16/113.1 |
| 6,161,253 | A | * | 12/2000 | Tu | 16/113.1 |
| 6,223,392 | B1 | * | 5/2001 | Chang | 16/113.1 |
| 6,295,698 | B1 | * | 10/2001 | Chang | 16/113.1 |
| 6,918,476 | B2 | * | 7/2005 | Chou | 190/115 |

* cited by examiner

*Primary Examiner*—Hau Phan
(74) *Attorney, Agent, or Firm*—Kolisch Hartwell, P.C.

(57) ABSTRACT

Locking device for a telescopic stem for a trolley wherein the stem comprises an inner stem and an outer stem, which may glide into each other, characterized in that a friction element is arranged in the outer stem and that the inner stem is equipped with the blocking element grasping into the friction element and locking the movement of the inner stem in relation to the outer stem, in that the blocking element presses against the friction element of housing with a conical groove linked to a rod stretching from the housing to the upper end of the inner stem and connected to a handle which influences the position of the housing.

4 Claims, 3 Drawing Sheets

LOCKING DEVICE FOR A TELESCOPIC STEM OF A TROLLEY

The present invention relates to a locking device for a telescopic stem with handle, for a trolley, and especially a children's trolley such as described in Norwegian patent 315230. The trolley comprises a central stem wherein a seat or another module may be height adjusted along the stem, and the height of the handle may be regulated in that the stem may be lengthened telescopically.

BACKGROUND OF THE INVENTION

It is proposed in the above mentioned patent that the central stem of the trolley can be lengthened in that the stem consists of two parts, wherein the upper part may, for example, be moved within the lower part. In order to lock the stem parts in relation to each other, a locking sleeve may for example be used at the transition between the parts.

The disadvantage of this solution is that the area around the transition is not easily accessible, since modules such as a children's seat which may be height adjusted all the way up to just under the transition, hinder access to the lock.

A telescopic handle is known from U.S. Pat. No. 4,302,029 on a golf trolley, wherein the inner and outer stems glide into each other and are locked by a locking pin, which penetrates both stems in the upper part of the outer stem.

There therefore exits a need for a locking device which may be remotely controlled from a more accessible area on the trolley.

OBJECT OF THE INVENTION

The object of the invention is to provide a solution for the remote control of a telescopic stem on a trolley, especially a children's trolley.

DETAILED DESCRIPTION OF THE INVENTION

The above objects are achieved by a remote controlled locking device wherein the stem comprises an inner stem (1) connected to a handle (1a) and an outer stem (2), wherein the inner stem can glide inside the outer stem, wherein a blocking element is present which locks movement of the inner stem (1) in relation to the outer stem (2), characterised in that a friction element (3) is placed in the outer stem (2) and that the inner stem (1) is equipped with the blocking element (4) grasping into the friction element (3) and locking the movement of the inner stem (1) in relation to the outer stem (2), in that the blocking element (4) is pressed against the friction element (3) of housing (5) with a conical groove (6) linked to a rod (7) stretching from the housing (5) to the upper end of the inner stem (1) and connected to a handle (8) which actuate the position of the house (5).

PREFERRED EMBODIMENT

Figure 1:
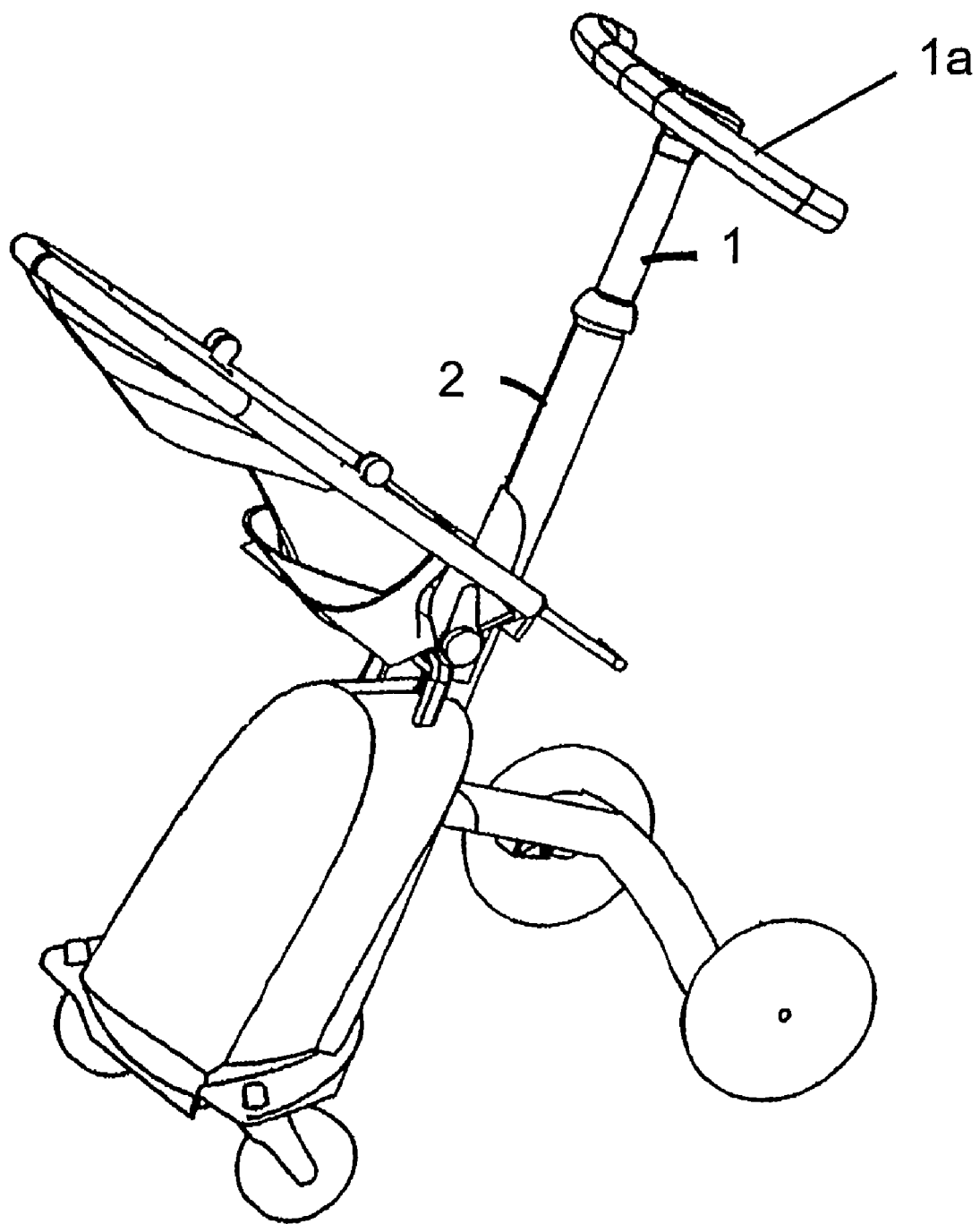
FIG. 1 depicts a perspective view of a trolley as described over.

The present invention is achieved by an inner stem 1 and an outer stem 2 wherein the inner stem 1 may glide into the outer stem 2 as shown in FIG. 1. The stems preferably have about the same cross sectional shape in order to hinder slack between the stems. A sleeve 20 prevents dirt and particles from entering between the stems as shown in FIG. 2.

Figure 3:
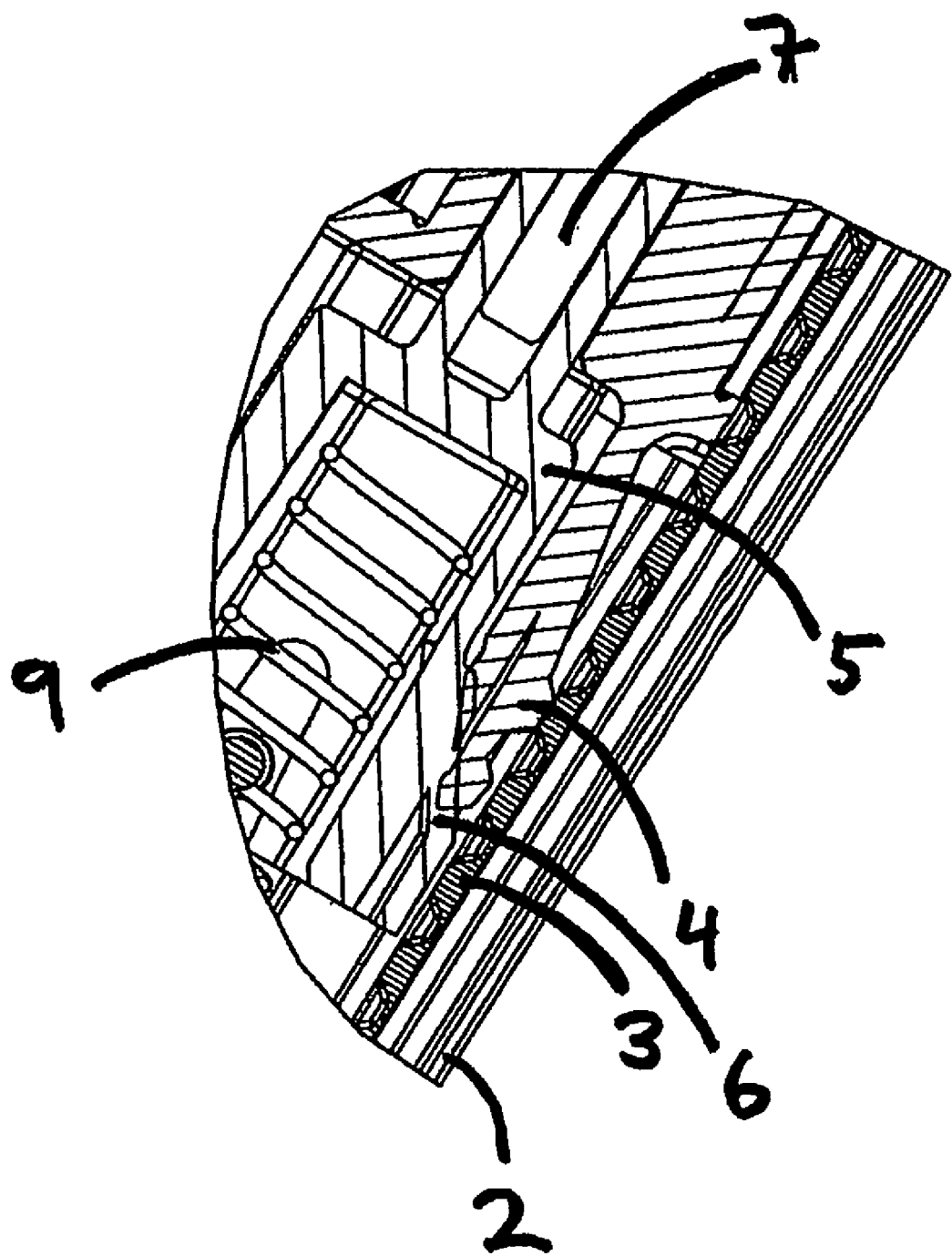
FIG. 3 depicts an enlargement of the marked area in FIG. 2.

The outer stem 2 is equipped with a friction element 3, as shown in greater detail in FIG. 3. The friction element 3 stretches over a large portion of the length of the outer stem 2. The inner stem 1 is equipped with a corresponding blocking element 4 which may lock into the friction element 3 and lock the movement of the inner stem 1 in relation to the outer stem 2. In this embodiment the friction element 3 is arranged on an inner area of the outer stem 2 and the blocking element 4 is arranged on the lower end of the inner stem 1, opposite the friction element 3.

The blocking element 4 presses against the friction element 3, achieved by that spring-loaded housing with a cocked or conical area or track 6 contained within, is pressed against the blocking element 4. The housing 5 is linked to a rod 7 which extends from the lower end of the inner stem 1 to the upper end of the inner stem 1, where the rod is linked to a handle 8, which tilts around an axis and is used to adjust the positioning of the housing.

Figure 2:
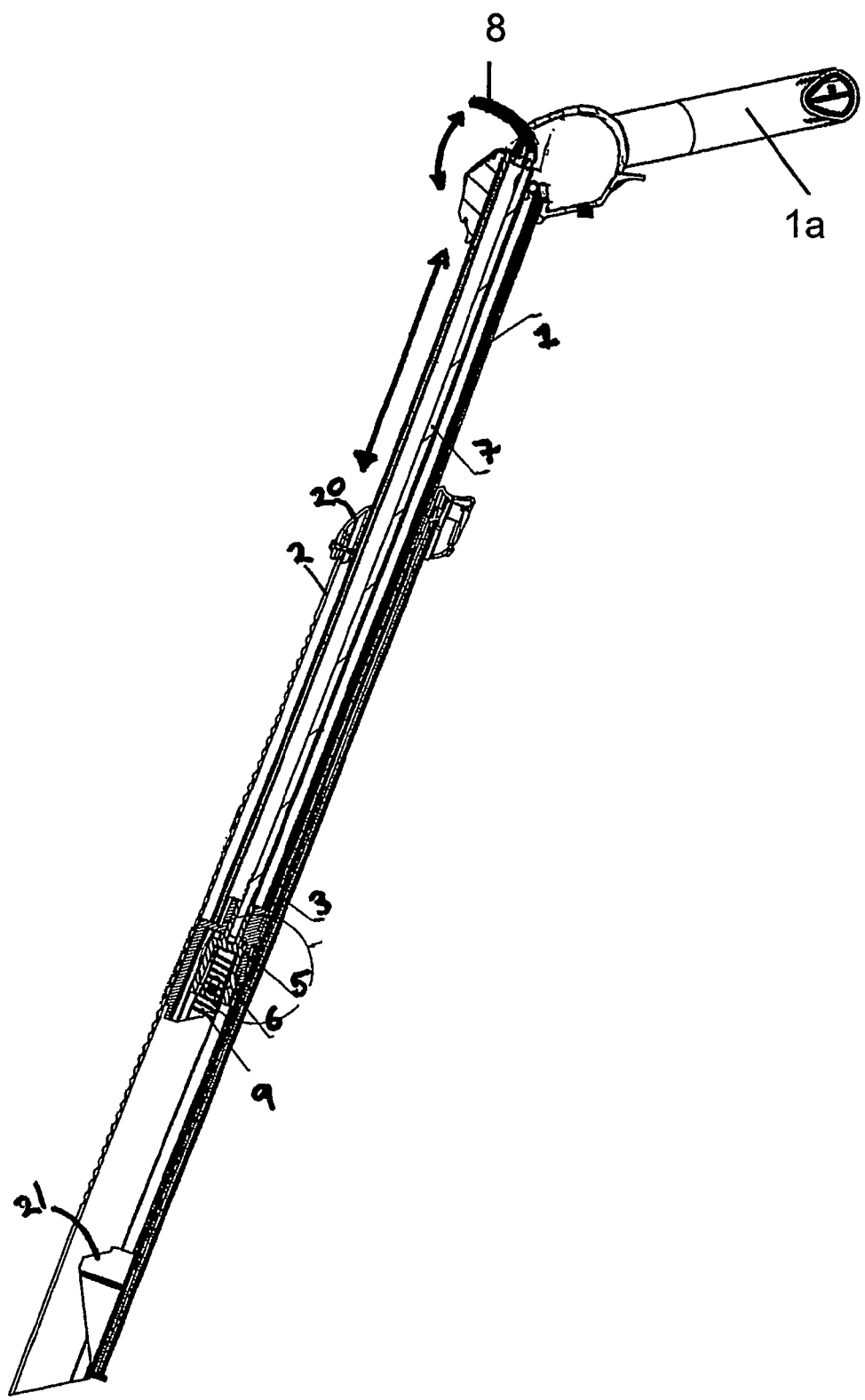
FIG. 2 is a section of the stem of the trolley in FIG. 1.

In FIGS. 2 and 3, the house 5 is in the lower position such that the inner stem 1 may move up or down in the outer stem 2, by releasing the blocking element 4 in relation to the friction element 3. The handle 8 is then in an elevated position, pressing the rod downwards in the lower position against the spring loading, provided by a spring 9, straining the housing 5 up from the end of the inner stem 1. When the handle 8 is pushed downward, the rod 7 is thereby pulled up and the house 5 presses the blocking element 4 into the friction element 3 and locking the movement of the inner stem 1 in relation to the outer stem 2.

As shown in FIG. 2, the end of the inner stem may move freely between an upper position limited by a sleeve 20, on the outer part of the upper end of the stem 2, and a lower position limited by an inner clamp 21 on the inside of the outer stem 2.

The invention claimed is:

1. A locking device for a telescopic stem for a trolley, wherein the stem comprises an inner stem connected to a first handle, which may glide within an outer stem, a second handle at the upper end of the inner stem for controlling the locking of the inner stem in relation to the outer stem, the second handle connected to a rod running through the inner stem, wherein a toothed friction element is arranged in the outer stem and that the inner stem is equipped with a toothed blocking element locking into the friction element and preventing movement of the inner stem in relation to the outer stem when the blocking element is pressed into the toothed friction element by a conical groove of a housing connected to the rod influencing the position of the housing, the second handle being configured to actuate positioning of the housing when pivoted around an axis.

2. A locking device according to claim 1, wherein the friction element is arranged on an inner area of the outer stem.

3. A locking device according to any one of claims 1-2, wherein the blocking element is arranged on the lower side of the stem, opposite the friction element.

4. A locking device according to any one of the claims 1-2, wherein at least one of the housing and the blocking element is spring-loaded by a spring, automatically affecting locking by the friction element.

* * * * *